United States Patent [19]
Larsson et al.

[11] 3,896,085
[45] July 22, 1975

[54] EMULSION COPOLYMERS OF ACROLEIN AND THEIR USE IN TREATING LEATHER

[75] Inventors: Bjorn E. Larsson, Rushland; Stanley Le Sota, Horsham, both of Pa.

[73] Assignee: Rohm and Haas Company, Philadelphia, Pa.

[22] Filed: Apr. 12, 1973

[21] Appl. No.: 350,573

Related U.S. Application Data

[63] Continuation-in-part of Ser. No. 160,178, July 6, 1971, abandoned.

[52] U.S. Cl. .......... 260/67 UA; 117/139.5; 117/142; 260/29.6 TA; 260/72 R; 260/73 R
[51] Int. Cl. .............................................. C08f 15/12
[58] Field of Search ................................ 260/67 UA

[56] References Cited
UNITED STATES PATENTS

| | | | |
|---|---|---|---|
| 2,416,536 | 2/1947 | Neher et al. .................. | 260/67 UA |
| 3,455,861 | 7/1969 | Bresciani et al. ........... | 260/67 UA X |
| 3,733,286 | 5/1973 | Holly et al. ................. | 260/67 UA X |

*Primary Examiner*—Lucille M. Phynes
*Attorney, Agent, or Firm*—Terence P. Strobaugh

[57] ABSTRACT

Emulsion copolymers containing (a) from about 0.25 to about 4% by weight acrolein, (b) from about 0.5 to about 10% by weight of an ethylenically unsaturated carboxylic acid, and (c) up to about 99.25% by weight of an alkyl acrylate, an alkyl methacrylate, or mixtures thereof are disclosed. The copolymers are useful in leather treating compositions, and particularly in base coat compositions.

7 Claims, No Drawings

EMULSION COPOLYMERS OF ACROLEIN AND THEIR USE IN TREATING LEATHER

This is a continuation-in-part of applicants' prior, copending application Ser. No. 160,178 filed July 6, 1971 and now abandoned.

This invention relates to novel copolymers containing acrolein and an α,β-unsaturated carboxylic acid; to leather treating compositions comprising the copolymers, to methods of treating leather, and to leather treated with the copolymers.

The commercial finishing of leather involves the consecutive application of one or more finish coats. The first finish coat is commonly referred to as the base coat, and is applied to leather to provide a base for good adhesion of subsequent finish coats and to cover, fill, or hide imperfections in the leather surface. The base coat is generally pigmented and quite flexible, and is followed by subsequent harder finish coats to improve the wear properties of the leather.

Many of the resinous binders presently employed in base coat formulations are deficient in certain properties. For example, when leather, with a base coat, is subjected to a plating or embossing operation, the base coat may stick to the embossing plate. If waxes, casein, and the like, are added to the formulations to improve plate release, the water resistance of the base coat is reduced. Moreover, many of the known base coats lack acceptable organic solvent resistance. Thus, it is disirable to have base coat formulations possessing both good plate release and good water resistance, as well as improved organic solvent resistance and flexibility.

It has now been found that copolymers containing an amount of acrolein of from about 0.25 up to about 4% by weight and which also contains from about 0.5 to about 10% by weight of an unsaturated carboxylic acid will overcome many of the disadvantages of the presently available leather treating compositions. Leather treating composition containing a small amount of acrolein and a sufficient quantity of an unsaturated carboxylic acid affords leather having (1) excellent plate release properties; (2) very good adhesion properties, whether the leather is wet or dry; (3) excellent finish extensibility; (4) excellent resistance to flex fatigue and (5) improved organic solvent resistance. In addition, the use of the copolymers disclosed herein permit low temperature curing which is advantageous since leather is temperature sensitive.

Furthermore, we have found that by employing low levels of an α,β-ethylenically unsaturated acid comonomer, for example, acrylic acid, methacrylic acid and the like mechanical or shear stability of the copolymer is greatly improved. Stabilization is most noticeable when the pH of the resin is on the alkaline side. Also, the use of unsaturated acid improves the stability of the copolymer towards electrolyte resin shock.

The present invention provides stable emulsion copolymers for preparing leather having improved properties by treating the leather with a base coat composition comprising an aqueous dispersion of an emulsion copolymer of a. from about 0.25 to about 4% by weight, and preferably from about 0.5 to about 3% by weight, of acrolein;

b. from about 0.5 to about 10% by weight, and preferably from about 1 to about 10% by weight, of an α,β-ethylenically unsaturated carboxylic acid or of a mixture of α,β-ethylenically unsaturated carboxylic acids preferably acrylic acid or methacrylic acid;

c. from 0 to about 99.25% by weight, of an alkyl ($C_1$–$C_{24}$) ester of methacrylic acid and preferably from about 0 to about 50% by weight, of an alkyl ($C_1$–$C_4$) ester of methacrylic acid or a mixture of said esters; and d. from 0 to about 99.25% by weight, of an alkyl ($C_1$–$C_8$) ester of acrylic acid and preferably from about 20 to about 90% by weight of an alkyl ($C_1$–$C_4$) ester of acrylic acid or of a mixture of said esters; the sum of ($a+b+c+d$) always being 100 parts by weight.

The base compositions of this invention in addition to their use on leather, also are useful on leather substitutes.

Examples of the α,β-ethylenically unsaturated acids which can be used in forming the copolymers of the invention include acrylic acid, methacrylic acid, ethacrylic acid, itaconic acid, aconitic acid, crotonic acid, citraconic acid, maleic acid, fumaric acid, α,chloroacrylic acid, cinnamic acid, mesaconic acid, and the like. Mixtures of these acids can also be used.

Examples of the alkyl ($C_1$–$C_{24}$) esters of methacrylic acid which can be used in forming the copolymers of the invention include methyl methacrylate, ethyl methacrylate, propyl methacrylate, isopropyl methacrylate, butyl methacrylate, isobutyl methacrylate, sec-butyl methacrylate, tert-butyl methacrylate, amyl methacrylate, isoamyl methacrylate, tert-amyl methacrylate, hexyl methacrylate, cyclohexyl methacrylate, 2-ethylbutyl methacrylate, 2-ethylhexyl methacrylate, octyl methacrylate, decyl methacrylate, lauryl methacrylate, myristyl methacrylate, cetyl methacrylate, stearyl methacrylate, and the like. Mixtures of these esters can also be used. Preferably a lower alkyl ($C_1$–$C_4$) ester of methacrylic acid or a mixture of the lower alkyl ($C_1$–$C_4$) esters of methacrylic acid is employed. Preferably, the copolymers of the invention will contain from about 10 to about 45% by weight of methacrylic acid ester units.

Examples of the alkyl ($C_1$–$C_8$) esters of acrylic acid which can be used in forming the copolymers of the invention include methyl acrylate, ethyl acrylate, propyl acrylate, isopropyl acrylate, butyl acrylate, isobutyl acrylate, sec-butyl acrylate, tert-butyl acrylate, amyl acrylate, isoamyl acrylate, tert-amyl acylate, hexyl acrylate, octyl acrylate, 2-ethylhexyl acrylate, and the like. Mixtures of these esters can also be used. Preferably, a lower alkyl ($C_1$–$C_4$) ester of acrylic acid or a mixture of lower alkyl ($C_1$–$C_4$) esters of acrylic acid is employed. Preferably, the copolymers will contain from about 40 to about 88.5% by weight of acrylic acid ester units.

The copolymers of the invention may contain additional vinyl monomers, for example, acrylic monomers. Blends of the copolymers of the invention with other polymers with or without acrolein can also be used in the aqueous dispersions of the invention, so that acrolein represents from about 0.25 to about 4% by weight of the total copolymer solids in the dispersion.

The copolymers of the invention can be prepared by conventional emulsion polymerization techniques. The emulsifiers or dispersing agents employed for preparing the monomer emulsions or copolymer emulsions may be the anionic, cationic, or non-ionic type. Also a mixture of any two types may be used.

Suitable anionic dispersing agents include for example the higher fatty alcohol sulfates, such as sodium lauryl sulfate, and the like, alkylaryl sulfonates, such as sodium or potassium isopropyl benzene sulfonates or isopropyl naphthalene sulfonates, and the like; alkali metal higher alkyl sulfosuccinates, such as, sodium octyl sulfosuccinate, sodium N-methyl-N-palmitoyltaurate, sodium oleyl isothionate and the like, and alkali metal salts of alkylarylpolyethoxyethanol sulfates or sulfonates, such as sodium tert-octylphenoxypolyethoxyethyl sulfate having 1 to 5 oxyethylene units and the like.

Suitable cationic dispersion agents include laurylpyridinium chlorides, cetyldimethyl amine acetate, and alkyldimethylbenzylammonium chlorides in which the alkyl group has from 8 to 18 carbon atoms, such as octyl, tert-octyl, decyl, dodecyl, octadecyl, and the like.

Suitable non-ionic dispersing agents include alkylphenoxypolyethoxyethanols having alkyl groups of from about 7 to about 18 carbon atoms and from about 6 to about 60 oxyethylene units, such as heptylphenoxypolyethoxyethanols, octylphenoxypolyethoxyethanols, methyloctylphenoxypolyethoxyethanols, nonylphenoxypolyethoxyethanols, dodecylphenoxypolyethoxyethanols, and the like; polyethoxyethanol derivatives of methylene-linked alkyl phenols; sulfur-containing agents such as those made by condensing from about 6 to about 60 moles of ethylene oxide with nonyl mercaptan, dodecyl mercaptan, tetradecyl mercaptan, tert-dodecyl mercaptan, and the like or with alkylthiophenols wherein the alkyl groups contain from 6 to 16 carbon atoms; ethylene oxide derivatives of long-chained carboxylic acids, such as lauric acid, myristic acid, palmitic acid, oleic acid, and the like or mixtures of acids such as found in tall oil containing from 6 to 60 oxyethylene units per molecule; analogous ethylene oxide condensates of long-chaines alcohols, such as octyl, decyl, lauryl, or cetyl alcohols, ethylene oxide derivatives of etherified or esterified polyhydroxy compounds having a hydrophobic hydrocarbon chain, such as sorbitan monostearate containing from 6 to 60 oxyethylene units; also, ethylene oxide condensates of long-chain or branched chain amines, such as dodecylamine, hexadecylamine, and octadecylamine, containing from 6 to 60 oxyethylene group; block copolymers of ethylene oxide and propylene oxide comprising a hydrophobic propylene oxide section combined with one or more hydrophilic ethylene oxide sections.

The polymerizable emulsions can be prepared at a temperature in the range of from about 0°C. to about 100°C., but intermediate temperatures are generally preferred. Peroxidic free-radical catalysts, particularly catalytic systems of the redox type, are recommended. Such systems, as is well known, are combinations of oxidizing agents and reducing agents such as a combination of potassium persulfate and sodium metabisulfate. Other suitable peroxidic agents include the "persalts" such as the alkali metal and ammonium persulfates and perborates, hydrogen peroxide, organic hydroperoxides, such as tert-butyl hydroperoxide and cumene hydroperoxide, and esters such as tert-butyl perbenzoate. Other reducing agents include water-soluble thiosulfates, hydrosulfites, tertiary amines, such as triethanolamine and the like, thiourea, and salts of metals such as the sulfate salts of metals capable of existing in more than one valence state such as cobalt, iron, nickel, and copper.

The most convenient method of preparing the dispersions of copolymers comprises agitating an aqueous suspension or emulsion of the mixture of copolymerizable monomers and redox catalytic combination at room temperature without the application of external heat. The amount of catalyst can vary but the usual range is from 0.01 to 3.0% of the peroxidic agent and the same or lower proportions of the reducing agent based on the weight of the monomer. In this way, it is possible to prepare dispersions which contain as little as 1% and as much as 60% or even more of the resinous copolymers on a weight basis. It is more practical and preferred to produce dispersions which contain from about 30 to about 50% resin solids.

If desired, a chain-transfer agent can be used to moderate the molecular weight of the copolymer obtained by the emulsion copolymerization procedure in proportion to the amount of chain-transfer agents used may be any one of the following: long-chain alkyl mercaptans, such as, for example, tert-dodecyl mercaptan, alcohols, such as isopropanol, isobutanol, lauryl alcohol, or tert-octyl alcohol, carbon tetrachloride, tetrachloroethylene and trichlorobromomethane. Generally, from about 0 to about 3%, by weight, based on the weight of the monomer charge, of the chain-transfer agent can be used.

A pigment is preferably introduced into the aqueous coating dispersion. The amount of pigment can be from about 10 to 150% by weight of the copolymer. Generally, the pigment is first dispersed in water (to a concentration of from about 10 to 70%) by means of a non-ionic or anionic dispersing agent or a mixture of both types thereof. Any of the dispersing agents mentioned above may be used. In addition, a small amount of a protective colloid may be included to thicken and-/or stabilize the suspension and prevent the pigment from settling out. Examples of such colloids include methyl cellulose, hydroxyethyl cellulose, polyvinyl alcohol, sodium, potassium or ammonium alginates, ammonium or alkali metal salts of homopolymers and copolymers of acrylic acid, methacrylic acid, itaconic acid, maleic acid, fumaric acid, sytrene, and the like, such as ammonium polyacrylate, sodium methacrylate and the like.

The aqueous dispersion of the copolymer with or without a pigment dispersed or suspended therin may be applied to the leather or leather substitute at a solids concentration of from about 10 to about 50% (including the weight of copolymer and pigment, if any). It may be applied by any suitable equipment such as by brushing, swabbing, dip coating or spraying onto the substrate. The amount of a copolymer applied on the substrate varies widely with the type of leather or leather substitute and the ultimate finish desired. For most purposes, the amount applied per thousand square feet of the leather or leather substitute may vary from 0.5 to 15 pounds, and preferably will be about 1 to 5 pounds.

For some purposes, the leather product carrying the single coating obtained from the application of the aqueous dispersion of a copolymer of the invention with or without pigment may serve as a suitable finished product. For example, this may be the case when it is desired only to impart a water repellent surface to the leather and the copolymer applied by the aqueous dispersion is of highly hydrophobic character.

However, since the base coat is often very flexible, one or more subsequent finish coats are often applied which are harder and provide better wear properties than would be available from the base coat alone. After the base coat (or coats) have been applied, there can be applied a plating coat (optional), often a plasticized nitrocellulose lacquer or lacquer emulsion with or without added pigment, resin, or dye and a final top coat, which also is often a nitrocellulose lacquer or lacquer emulsion with or without added pigment, resin, or dye. Other tough film formers, such as vinyls, cellulose acetate butyrates, cellulose acetate propionates and other cellulosic film formers, and polyurethanes may also be used to advantages as later finish coats. Any suitable lacquer composition may be applied such as those which comprise as the film-forming material and addition polymer of vinyl, acrylic or related types, a cellulose derivative such as a nitrocellulose or cellulose organic acid esters such as cellulose acetate, cellulose acetate butyrate or the like. Both solvent-cuttable lacquers, including multicomponent reactive solvent-borne systems such as polyurethanes, and water-or solvent-reducible lacquer-water emulsions can be used. The lacquers may comprise a plasticizer if the film-forming agent itself is not adequately flexible. When a single lacquer top coating is applied over the coating obtained from the aqueous polymer dispersion, it may be clear, it may be dulled by a filler or other suitable agent, such as a water-insoluble soap like aluminum stearate, or silicas, or it may be colored with a white, black or suitably colored pigment. Preferably at least two lacquer top coatings are applied in succession over the coating obtained from the aqueous dispersion. When two such lacquer coatings are applied, the first is preferably pigmented to augment the color and covering obtained by the pigment, if any, applied by the coating from the aqueous dispersion and the second lacquer coating is preferably clear or merely dulled to provide the glossiness or flatness desired in the final surface.

Each of the subsequentially applied coatings should be dried before any later coating is to be applied and drying may be effected as before either at normal room temperature in the ambient atmosphere or at somewhat elevated temperatures up to 50°C.

If desired, the leather may be plated or embossed after the coating applied in the aqueous dispersion has been dried on the leather and before subsequent lacquer coatings are applied, or embossing may be applied at any time after subsequent coatings are applied but preferably before the last or final coat is applied. Such embossing should, in all cases, be applied to the coated leather in a dry condition. Plating of the leather, in which the leather is heated to up to 225° F. or higher and subjected to pressures of up to 300 tons per square inch or more can be used to smooth the leather or to emboss the surface of the leather with a pattern, either with an artifical or a natural grain such as an animal grain or design. Plating is often done smooth to the base coated leather and may be left smooth or textured after the plating coat. The exact nature of the operations and their sequence can be varied greatly.

The pigments that may be employed in the dispersion include carbon blacks, red iron oxide, chrome green, molybdate chrome orange, phthalocyanines, such as copper phthalocyanine, titanium dioxide, lithopone, chrome yellow, ultramarine blue, red cadmium, yellow cadmium, organic toners and lakes, and the like.

The base coat compositions of the invention can also comprise curing agents such as ammonia or an organic polyprimary amine, such as 1,2-ethylene diamine, polyalkyleneamines, including diethylenetriamine, triethylenetetramine, and the like, 1,6-hexamethylenediamine, hydrazine, 1,8-diamino-p-menthane, and the like. The preferred curing agents are ammonia, diethylenetriamine and hydrazine. The concentration of ammonia or amine in the compositions will depend on the degree of crosslinking which is desired, and practically any ratio of aldehyde to amine can be used in the composition which will give a finished leather having an adequate balance of physical performance and aesthetic appearance. Generally, the ratio of primary amine groups to aldehyde groups in the composition will be from about 0 to 10:1, and preferably from about 1:2 to about 2:1. If a volatile curing agent such as ammonia is used, an excess, even a very large excess, of the amine can be used, since this excess can be volatilized during drying.

The base coat compositions of the invention, either with or without an added curing agent, can be cured by drying at room temperature or by gently heating up to about 80°C. One preferred drying method is to heat the treated leather in an oven at a temperature in the range of from about 45° to 60°C. for up to about an hour and then to air dry the leather at room temperature overnight. Although less thorough drying may be practicable between sequential applications of the base coat composition, a more complete drying is usually desirable after application of the final base coat prior to plating to insure good plate release.

Since many of the pigments and other auxiliary components generally used in base coat compositions are not physically stable at low pH, the compositions of the invention are generally formulated at a pH of about 7 to 10, and preferably of about 9 to 10. Neutralization of the copolymers of the invention in aqueous dispersion can be accomplished by the addition of ammonia or a suitable organic amine, such as dimethylaminoethanol, triethylamine and the like.

The base coat compositions of the invention can contain, in addition to a pigment, any of the other auxiliaries commonly used in leather treatment compositions, including defoamers, plate release aids, fillers, dulling agents, leveling agents, thickening agents, preservatives, stabilizers, antioxidants, antiozodants, and the like.

The base coat compositions of the invention are water insoluble and have good pot life when formulated with pigments and other auxiliaries, and when formulated with an amine cross-linker. The formulated composition can be used even several days after formulation.

The copolymers of the invention give base coat compositions having several advantages over the various prior art base coat compositions for treating leather and leather substitutes. First, the copolymers of the invention can be cured at low temperature. Leather is temperature sensitive and may be damaged or destroyed by prolonged heating or exposure to high temperature. The copolymers of the invention avoid this potential deleterious effect on the properties of the leather treated. Furthermore, as noted above, the polymers of the invention can be formulated at a high pH at which the pigments and other auxiliary components used in the formulation are stable.

A further advantage of the base coat compositions of the invention is the combination of aldehyde and acid functionality in the same composition, unexpectedly without interfering interaction between these two groups. Thus, the compositions of the present invention combine the useful properties of aldehyde functionality, such as ability to cure at low temperatures and reactivity with diamines, with the useful properties of acid functionality, such as improvement in mechanical stability and improvement in pigment dispersibility.

Leather coated with the base coat compositions of the invention also has improved properties. Among these improved properties are good plate release, without the necessity of adding waxes, casein, or the like, which can lower the water resistance of the leather; the ability to withstand hot ironing, a property lacked by most of the various thermoplastic base coat compositions; excellent water resistance, even in the presence of caseinated pigment; good Bally flexibility that is, resistance of the leather and the finish coat to deterioration upon repeated flexing, and a good balance of physical properties and aesthetic appearance. Many of the prior art base coats are thermoplastic and have poor resistance to organic solvents. Thus, the application of a later finishing coat, which is solvent-borne, directly over such a base coat can result in significant damage to the base coat. However, the base coat formulations of the instant invention, particularly those comprising ammonia or a primary amine, exhibit excellent solvent resistance, and thus are extremely useful with solvent-based topcoats, such as reactive or non-reactive polyurethane systems.

The copolymers of the invention can also be used in forming films; coatings for paper, textiles, wood, plastics, metal, and the like; and as binders for non-woven fabrics, adhesives, and the like.

The following examples will further illustrate the invention but are not intended to limit it in any way. All parts and percentages are by weight and all temperatures are in degree Centrigrade, unless otherwise noted.

EXAMPLE 1

The following example illustrates a typical preparation of a copolymer of the invention using a gradual addition, reflux process.

A monomer emulsion containing the following materials is prepared:

| | |
|---|---|
| Water | 363.9 ml |
| Sodium dodecylbenzene sulfonate | 8.1 g |
| Ethyl acrylate | 693.0 g |
| Methyl methacrylate | 153.0 g |
| Acrylic acid | 18.0 g |
| Acrolein | 36.0 g |

Into a 2 l.3-neck flask equipped with a stirrer, thermometer, condenser, and nitrogen inlet are charged 944.0 ml of water, 64.0 g of the monomer emulsion descried above, and 0.9 g of sodium dodecylbenzene sulfonate. The flask is then flushed with nitrogen and after heating to about 80°C., 4.5 g of sodium persulfate is added. After 10 minutes, gradual addition of the rest of the monomer emulsion is begun while keeping the temperature at about 80° to 85°C. Addition is completed after 90 minutes, and the emulsion is heated at 80° to 85°C. for an additional 30 minutes. After cooling to 30°C., the reaction mixture is filtered through cheesecloth to give the emulsion product.

EXAMPLE 2

Using conventional redox polymerization processes, similar copolymers of the invention are prepared.

EXAMPLE 3

By following substantially the procedure described in Example 1 or Example 2, copolymer dispersions useful in treating leather are prepared from monomer emulsions having the following weight ratios of monomers:

a. methyl methacrylate/ethyl acrylate/acrylic acid/acrolein 15/80/4/1
b. methyl methacrylate/ethyl acrylate.methacrylic acid/acrolein 16/80/1/3
c. methyl methacrylate/methyl acrylate/methacrylic acid/acrolein 15/81/2/2
d. ethyl methacrylate/ethyl acrylate/acrylic acid/acrolein 21/71/5/3
e. ethyl methacrylate/ethyl acrylate/itaconic acid/acrolein 22/73/1/4
f. ethyl methacrylate/ethyl acrylate/methacrylic acid/acrolein 22/73/1/4
g. butyl methacrylate/ethyl acrylate/methacrylic acid/acrolein 24/72/2/2
h. isobutylmethacrylate/methyl acrylate/acrylic acid/acrolein 20/77/1/2
i. methyl methacrylate/butyl acrylate/methacrylic acid/acrolein 15/72/10/3
j. methyl methacrylate/butyl acrylate/methacrylic acid/acrolein 20/72/5/3
k. methyl methacrylate/butyl acrylate/methacrylic acid/acrolein 30/67/1/2
l. methyl methacrylate/butyl acrylate/methacrylic acid/acrolein 29/67/1/3
m. methyl acrylate/methacrylic acid/acrolein 39/57/1/3
n. methyl methacrylate/butyl acrylate/acrylic acid/acrolein 36/60/1/3
o. methyl methacrylate/butyl acrylate/acrylic acid/acrolein 42/54/2/2
p. methyl methacrylate/butyl acrylate/methacrylic acid/acrolein 40/57/1/2
q. methyl methacrylate/butyl acrylate/methacrylic acid/acrolein 40/57/1/2
r. methyl methacrylate/isobutyl acrylate/acrylic acid/acrolein 36/60/0.5/3.5
s. methyl methacrylate/isobutyl acrylate/acrylic acid/acrolein 36/60/1/3
t. ethyl methacrylate/isobutyl acrylate/methacrylic acid/acrolein 55/43/1.5/0.5
u. butyl methacrylate/butyl acrylate/itaconic acid/acrolein 60/30/6/4
v. methyl methacrylate/2-ethylhexy acrylate/acrylic acid/acrolein 50/40/8/2
w. lauryl methacrylate/methyl acrylate/methacrylic acid/acrolein 15/76/5/4
x. stearyl methacrylate/ethylacrylate/methacrylic acid/acrolein 30/64/3/3
y. stearyl methacrylate/butyl acrylate/acrylic acid/acrolein 46/52/1/1
z. methyl methacrylate/ethyl acrylate/acrylic acid/acrolein 14/73/10/3
aa. butyl methacrylate/acrylic acid/acrolein 98/1/1 bb. lauryl methacrylate/methacrylic acid/acrolein 92/5/3
cc. ethyl acrylate/methacrylic acid/acrolein 94/3/3
dd. butyl acrylate/methacrylic acid/acrolein 96/1/3
ee. butyl acrylate/methacrylate acid/acrolein 95/1/4
ff. 2-ethylhexyl acrylate/acrylic acid/acrolein 95/1/4
gg. 2-ethylhexyl acrylate/maleic acid/acrolein 95/2/3
hh. methyl methacrylate/butyl acrylate/methacrylic acid/acrolein 4/57.75/1/0.25

EXAMPLE 4

Generally, the principal ingredients of a base coat formulation are pigment, binder, and water. Optional ingredients include waxes, levelers, dulling agents, and the like. The following formulations are typical of base coat formulations comprising a polymer of the invention:

| Ingredient | Formulation I | Formulation II |
|---|---|---|
| Water | 32.9 pts. | 34.8 pts. |
| Leveling agent (parts) of 20% solids solution) | 3.0 | 3.4 |
| Embossing release aid (parts of 15% solids solution) (optional) | 6.2 | 6.7 |
| Nonfilm forming dulling agents (parts of 16% solids dispersion) | 7.0 | — |
| Carbon black pigment (parts of 13% solids dispersion) | 26.0 | 28.7 |
| Polymer (parts of 40% solids dispersion) | 24.5 | 26.2 |
| 28% Aqueous ammonia | 0.2 | 0.2 |
| Diethylenetriamine (optional) | 0.2 | 0.2 |

The order in which these ingredients are mixed can be varied. Suitable mixing directions will be found, for example, in "Leather Finishers' Troubleshooting Manual," a publication of Rohm and Haas Company, Philadelphia (1969). The diethylenetriamine, or other crosslinking amine is added to the formulation after adjustment of the pH to about 9 to 10.

EXAMPLE 5

Typical Finishing Sequence

The following finishing sequence is typical of those in which base coat formulations containing copolymers of the invention can be used:
1. Swab first base coat
2. Oven dry about one/fourth hr. (or air dry about 1 hour at room temperature) at 115° to 140°F.
3. Swab second base coat
4. Dry as in step 2
5. Swab third base coat (third base coat optional)
6. Air dry overnight
7. Plate (sand blast plate), 170°–190°F./30 tons/3 seconds
8. Spray one cross coat of water cut lacquer emulsion plating coat Typical Formulations:

| | |
|---|---|
| Clear plasticized cellulose ester lacquer (parts of 13.5% solids emulsion) | 62.5 |
| Water | 18.5 |
| Dulling Agent (parts of 16% solids dispersion) | 4.9 |
| Black pigment (parts of 4% solids dispersion) | 4.5 |
| Resinous binder (optional) (parts of 35% solids aqueous dispersion) | 7.1 |
| Resinous binder (optional) (parts of 42% solids nonaqueous emulsion) | 2.6 |

9. Dry at 120°F. for 30 minutes
10. Plate (same conditions as step 7)
11. Spray one cross coat of nitrocellulose top coat Typical Formulation:

| | |
|---|---|
| Plasticized nitrocellulose lacquer | 32.5 |
| Thinner | 42.2 |
| Black pigment (parts of 4% solids dispersion) | 10.0 |
| Dulling agent (parts of 16% solids dispersion) | 10.3 |

EXAMPLE 6

This example illustrates the improved properties of leather treated with base coat formulations comprising the polymers of the invention.
The following tests are used:

Test 1. Water Resistance

Leather which has been immersed in tap water for one/half hour is subjected to abrasion on a Multech Wet Crock Meter (available from Milwaukee School of Engineering, Milwaukee, Wis). Typical ratings estimate % of finish area damaged as a function of the number of abrasion cycles with a four pound weight. Base coated leather is tested after finishing through step 7 (above) and top coated leather through step 11. Relative resistance to wet crocking can also be evaluated by hand rubbing the treated leather with a wet cloth.

Test 2. Solvent Resistance

Solvent resistance is determined by the apparatus and procedure essentially as described in the "Official Methods of Analysis, 1965" of Society of Leather Trades Chemists as test SFL-6 entitled "Methods for the Determination of Fastness to Rubbing of Light Leather Wetted from the Back with Organic Solvents". The number of cycles which result in a significantly detectable finish damage are recorded.

Test 3. Plate Release

Plate release is a subjective rating of the degree to which base coated leather sticks to plating press used for smooth plating or embossing of leather. Conditions (Watson-Stillman press with 11 inch ram) were 30 tons at 170°–190°F.

Leather treated with various base coat formulations comprising an aqueous dispersion of a copolymer of the invention and ammonia ester by itself or with an amine is compared with a similar copolymer not containing acrolein and ammonia or an amine. The results of Tests 1 and 2 are summarized in the following Table I. The polymers evaluated are:

Polymer A. ethyl acrylate/methyl methacrylate/acrylic acid/acrolein 81/16/1/2
Polymer B. ethyl acrylate/methyl methacrylate/acrylic acid 81/18/1

Table I

| Polymer | Curing Agent | Water Resistance (% of Finish Area Damaged) | Solvent Resistance (Cycles to First Finish Damage) |
|---|---|---|---|
| A | NH$_3$ | 65% (775 cycles) | 32 |
| A | NH$_2$+DETA[1] | 8% (775 cycles) | 128 |
| B | NH$_3$ | 77% (775 cycles) | 4 |
| B | NH$_3$+DETA[1] | 50% (375 cycles) | — |

[1]DETA — Diethylenetriamine

Leather treated with base coat formulations comprising aqueous dispersions of copolymers of Examples 3; (b), (i), (j), (k), (m), (p), (dd), and (ee) are evaluated for solvent resistance and plate release. The treated leather has good solvent resistance and acceptable or better plate release. Leather treated with base formulations comprising aqueous dispersions of copolymers similar to those noted above but not containing acrolein has poor solvent resistance, and poorer plate release by comparison.

When leather substitutes, such as that available under the trade Corfam, are treated with the base coat formulations of the invention, similar useful properties are obtained.

Examples 7 and 8 show a comparison of leather treated with copolymer A of the instant invention with copolymer B disclosed in Example 5 of U.S. Pat. No. 2,416,536.

EXAMPLE 7

Base Coated Leather

Two polymers are prepared by standard emulsion polymerization techniques — Polymer A of the invention, containing 97.25% by weight methyl acrylate, 2% by weight acrolein, and 0.75% by weight acrylic acid, and Polymer B of U.S. Pat. No. 2,416,536, containing 74.25% by weight methyl acrylate, 25% by weight acrolein, and 0.75% by weight acrylic acid. Each of these polymers is formulated into a leather base coat composition as follows:

|  | A | B |
|---|---|---|
|  | (parts by weight) | |
| Water | 38.6 | 18.5 |
| Ammonia (28% aqueous) | 1.4 | 1.4 |
| Black pigment | 31.3 | 31.3 |
| Diethylenetriamine (10% aqueous) | 1.4 | 18.9 |

The formulated base coat is swabbed onto Rueping, impregnated, corrected grain black Tomahawk leather, dried and plated (180°F.; 30 tons; 4 second dwell) using normal leather finishing techniques. The resultant leather is tested for adhesion (Bally flex) and finish extensibility (SATRA Elastometer) and Textile Crock [abrasion of wet leather with wet cloth on AATCC Crockmeter (4 pound weight)]. Results are summarized in Table II.

Table II

Properties of Base Coated Leather

| Polymer | Bally Flex[1] Wet | Dry | Finish Extensibility | Textile Crockmeter Cycles to Initial Finish Damage[3] |
|---|---|---|---|---|
| A | Good | Very Good | 5.0 mm. | 120 |
| B | Very Poor | Very Poor | ~0 mm. | 20 |

EXAMPLE 8

Fully Finished Leather

Corrected grain, impregnated (Rueping, black back Tomahawk) leathers are base coated with the formulation of Polymers A and B, then finished further by spraying onto them an aqueous reducible plasticized nitrocellulose top coat with drying and plating (160°2.; F.; 30 tons; 4 second dwell) between coats. As is done by prior art, the resultant leathers were tested for finish adhesion and extensibility by Bally Flex and SARTA Elastometer methods. The results are summarized in Table III.

Table III

Properties of Fully Finished Leather

| Polymer | Bally Flex[1] Wet | Dry | Finish Extensibility | Textile Crockmeter Cycles to Initial Finish Damage[3] |
|---|---|---|---|---|
| A | Fair-Good | Good | 4.8 mm. | >1000 |
| B | Very Poor | Very Poor | ~0 mm. | 110 |

[1]Very Good: — few shallow cracks, no finish peeling or removal
Good: — several cracks, no finish removal
Fair: — moderate cracking
Poor: — numerous cracks and finish peeling
Very Poor: — more numerous deep cracks, finish peeling, and removal.
[2]SATRA Lastometer Values — the higher numbers indicate better extensibility.
[3]Wet Leather tested with wet cloth — four pound weight on leather (arm plus extra weight) on AATCC Textile Crockmeter, the higher numbers indicate better wet abrasion resistance.

EXAMPLE 9

Mechanical Stability of Copolymers Containing Unsaturated Carboxylic Acid

Two polymer emulsions are prepared by standard emulsion polymerization techniques — Polymer C, containing 81% by weight ethyl acrylate, 16% by weight methyl methacrylate, 2% by weight acrolein, and 1% by weight acrylic acid, and Polymer D, containing 82% by weight ethyl acrylate, 16% by weight methyl methacrylate, and 2% by weight acrolein. The two polymer emulsions are neutralized to pH 9 with a 28% aqueous ammonia solution and tested for mechanical stability by agitation in a Waring Blender, model 702A, at the high speed setting. Results are summarized in Table IV.

Table IV

| Mechanical Stability | | | | | | |
|---|---|---|---|---|---|---|
| Polymer | pH | \multicolumn{5}{c}{Time (seconds)} |
| | | 10 | 60 | 120 | 180 | 300 |
| C | 9 | Pass | Pass | Pass | Pass | No coagulation, viscous |
| D | 9 | Fail (heavy coagulation) | — | — | — | — |

These comparative tests show that Polymer C, which contains acid, possesses acceptable mechanical stability under alkaline conditions, whereas Polymer D, which contains no acid, has extremely poor mechanical stability under alkaline conditions.

It is to be understood that changes and variations may be made without departing from the spirit and scope of the invention as defined by the appended claims.

What is claimed is:

1. An emulsion copolymer of
   a. from about 0.25 to 4% by weight of acrolein;
   b. from about 0.5 to about 10% by weight of an $\alpha,\beta$-ethylenically unsaturated carboxylic acid or a mixture of $\alpha,\beta$ethylenically unsaturated carboxylic acids;
   c. from 0 to about 99.25% by weight of a alkyl $(C_1-C_{24})$ ester of methacrylic acid or a mixture of alkyl $(C_1-C_{24})$ esters of methacrylic acid; and
   d. up to about 99.25% by weight of a alkyl $(C_1-C_8)$ ester of acrylic acid or of a mixture of alkyl $(C_1-C_8)$ esters of acrylic acid, the sum of $(a+b+c+d)$ always being 100 parts by weight.

2. The copolymers of claim 1 wherein (c) is present in an amount of from about 0 to about 50% by weight.

3. The copolymers of claim 1 wherein (d) is present in an amount of about 20 to about 90% by weight.

4. The copolymers of claim 3 wherein (c) is present in an amount of about 0 to about 50% by weight.

5. The copolymers of claim 1 wherein the esters are alkyl $(C_1-C_4)$ esters.

6. The copolymers of claim 1 wherein the $\alpha,\beta$-ethylenically unsaturated carboxylic acid is acrylic acid or methacrylic acid.

7. An emulsion copolymer of claim 1 of
   a. from about 0.5 to about 3% by weight of acrolein;
   b. from about 1 to about 10% by weight of an $\alpha\beta$-ethylenically unsaturated carboxylic acid or a mixture of $\alpha,\beta$-ethylenically unsaturated carboxylic acids;
   c. from about 0 to about 50% by weight of an alkyl $(C_1-C_4)$ ester of methacrylic acid or a mixture of said esters, and
   d. from about 20 to about 90% by weight of an alkyl $(C_1-C_4)$ ester of acrylic acid or a mixture of said esters, the sum of $(a+b+c+d)$ always being 100 parts by weight.

* * * * *